Figure 1:
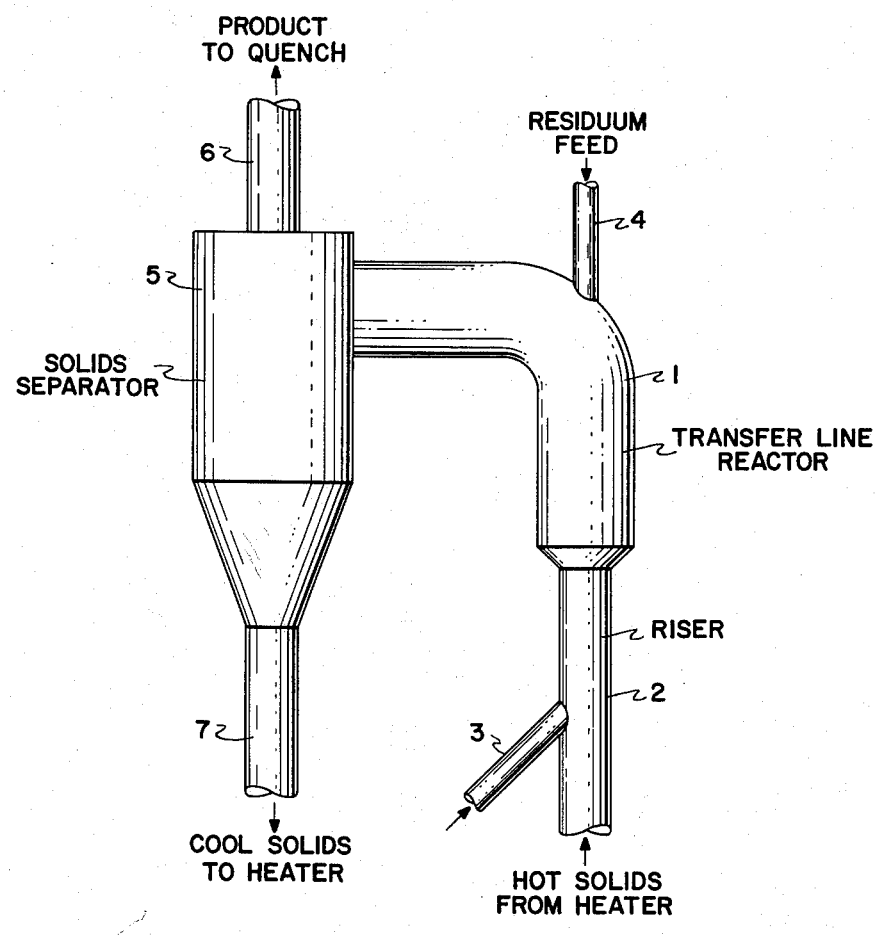

William J. Metrailer  Inventor 3,113,985
RESIDUUM FEED INJECTION IN TRANSFER LINE COKING
William Joseph Metrailer, Baton Rouge, La., assignor to Esso Research and Engineering Company, a corporation of Delaware
Filed Apr. 10, 1957, Ser. No. 652,037
6 Claims. (Cl. 260—683)

This invention relates to improvements in the transfer line coking of heavy hydrocarbon oils to normally gaseous unsaturated hydrocarbons. More particularly it relates to an improved method of injecting the heavy hydrocarbon oil feed for the process.

In the prior art various proposals have been made for carrying out reactions by contacting gases, vapors and liquids with particulate solids flowing in the form of a dispersed suspension in a transfer line. A particular application of this general technique relates to the coking or thermal conversion of heavy hydrocarbon oils to low molecular weight normally gaseous hydrocarbon unsaturates and coke, generally conducted at a temperature in the range of 1100° to 1800° F.

In the coking reactions particularly the desired conversion ordinarily is accomplished by contacting the material to be converted with a rapidly flowing stream or dispersed suspension of preheated, finely divided, usually non-catalytic or inert solid particles such as coke, sand, etc. (As to nomenclature see Industrial and Engineering Chemistry, vol. 41, page 1249.) These particles may vary in size but ordinarily they range between about 20 and 800 micron particle diameter with a consequent wide difference in actual particle size in any given sample.

Heavy hydrocarbon oil feeds suitable for the process are reduced crudes, vacuum bottoms, pitch, asphalt, other heavy hydrocarbon residua or mixtures thereof. Typically such feeds can have an initial boiling point of about 700° F., an A.P.I. gravity of about 0° to 20°, e.g., 1.9°, and a Conradson carbon content of about 5 to 40 wt. percent. (As to Conradson carbon residue see A.S.T.M. Test D-189-41.)

One of the problems in the high temperature coking for chemicals is the obtaining of uniformity of dispersion of the heavy viscous feed materials, uniformity of contacting between the feed and solids heat carrier, and uniformity of processing in the reaction itself. These problems of control arise from the fact that the liquid has to be injected at a relatively high velocity in order to produce fine droplets. In addition the time required to vaporize the liquid droplets can be an appreciable percentage of the total holding time. These have to be considered in conjunction with the fact that the contact time in coking for chemicals in order to prevent product degradation is less than about 2 seconds.

This invention provides an improved method of overcoming the difficulties that prevent the uniform dispersion and processing of the heavy hydrocarbon oils. The method comprises injecting these oils into the dispersion of the hot solids countercurrent to their direction of flow at the axis of the solids stream, i.e., axially opposed, so that the feed contacts the solids prior to contacting the wall surfaces of the transfer line reactor. Preferably also the feed is introduced at a point where there is a change in the direction of flow of the solids.

The injection manner of this invention causes the hold-up time of the largest droplets to be greater than that of the smallest droplets and thereby provides a more uniform contacting time for the vaporized feed. Additionally the countercurrent flow of the liquid droplets and the fine heat carrying particles greatly increases the contacting between the two materials and produces more positive dispersion of the feed materials on the solids.

As stated previously the liquid is preferably introduced at a point where there is a change in the direction of flow of the solids. In this way the solids concentration at the point of injection is increased. The solids, which are in suspension in the carrying gas, concentrate where the conduit changes direction, thereby creating a localized point of high solids concentration. The change in direction may range from 45° to 90° with a 90° bend, such as that formed by a standard pipe elbow being suitable. Further localized concentration of solids may be obtained by having a recess or pocket at the bend. For example, a standard type pipe T may be used to cause a change in direction of the solids stream. The preheated solids would enter along the straight run of the T and the atomized liquid injected countercurrently through the other side of the straight run. The mixed solids and liquid would leave through the base of the T.

Figure 2:
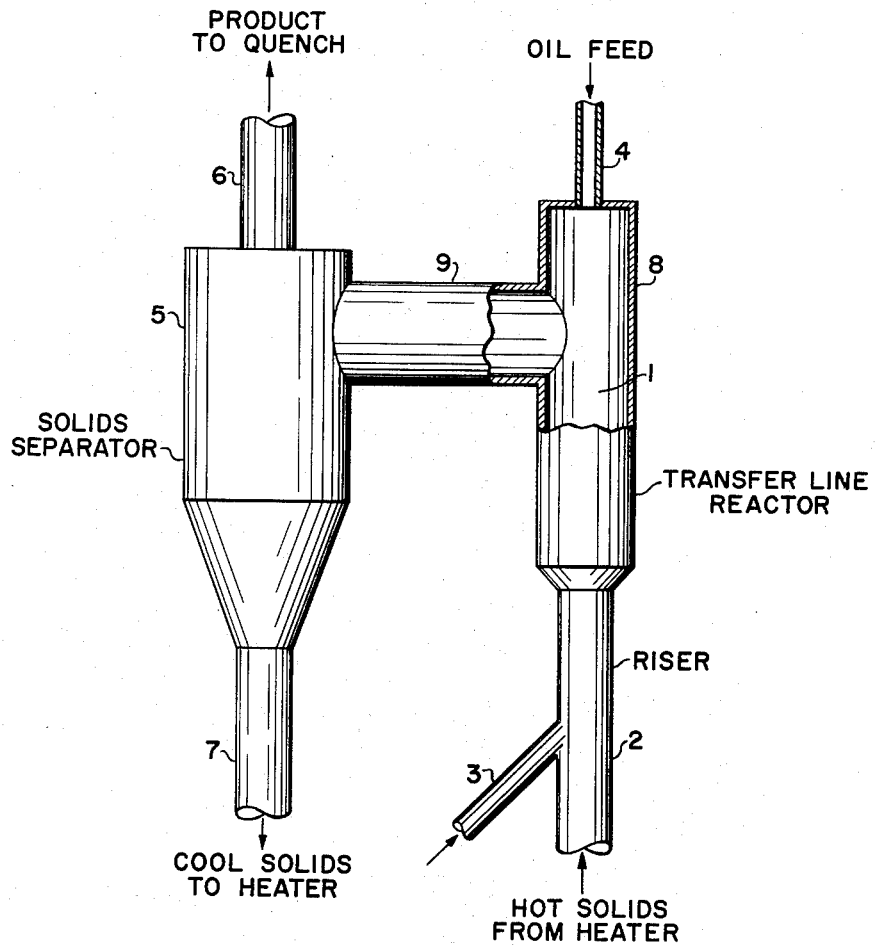

This invention will be better understood by reference to the drawing in which:

FIG. 1 is a front elevation of one form of apparatus for practicing the invention; and FIG. 2 represents another form of the invention in which a pocket is provided in the transfer line bend, parts being broken away to facilitate the disclosure.

Referring now to the drawing, hot coke solids at a temperature of 1600° F. from a burner, not shown, are fed into transfer line reactor 1 through a riser 2. A gas, e.g. steam, can be injected through line 3 or from a multiplicity of points. The superficial velocity of the gas is 30 ft./sec. The coke is thus in the form of a dispersed suspension. Residuum feed, e.g., a South Louisiana reduced crude, at a temperature of 650° F. is introduced through line 4 as an axial stream into the upper portion of the transfer line reactor 1 in such a manner that the feed is axially opposed to the solids flow and is countercurrent thereto. The feed contacts the solids prior to contacting the surface or wall of the transfer line reaction zone. Uniformity of dispersion and cracking is thereby obtained with a total cracking contact time of about 0.2 to 0.4 second so as to obtain the desired reaction to ethylene, propylene, butadiene and other unsaturates. It should be noted that the point of liquid injection is that where there is a change in direction of flow of the solids; in this case a 90° change so that the solids concentration is increased at the injection point. The effluent of coke particles and unsaturated products enters cyclone separator 5, although other conventional gas-solids separation means can be used. The unsaturated products are withdrawn overhead through line 6 and can be quenched and processed in the conventional manner. Water, hydrocarbon oils or cooled solids can be used as the quench medium. The solids from separator 5 are withdrawn through line 7 and are recycled to the burner, not shown, for the generation of the heat required in the process.

Referring now to FIG. 2 of the drawing, the same reference characters denote the same elements as in FIG. 1. The transfer line reactor 1 differs from that shown in FIG. 1 and is made by using a standard pipe T. The lower end of the T is designated as a transfer line reactor 1 and the upper end of the T at 8 forms a pocket or recess in which solids accumulate due to the change in direction of flow of the upflowing gaseous solids suspension in the transfer line 1 and into which the liquid oil feed is introduced through line 4. The mixed solids and liquid oil pass through the base of the T designated by reference character 9.

The conditions of transfer line coking of heavy hydrocarbon oils for chemicals are elaborated upon in the table presented below.

*Conditions in Transfer Line Reactor*

|  | Broad Range | Preferred Range |
|---|---|---|
| Temperature, °F | 1,100–1,800 | 1,400–1,600 |
| Superficial Velocity of Gas in Transfer Line Reactor, ft./sec. | 5–150 | 30–75 |
| Contact Time, sec. | 0.01–2.0 | 0.2–1.0 |

The heater can be a fluid bed or transfer line heater with the solids heated to a temperature of 1200° to 2300° F., preferably 1600° to 1800° F.

The advantages of this invention will be apparent to the skilled in the art. A simple, economical method of feed injection is provided which overcomes the problems involved in obtaining uniformity of dispersion, contacting solids and liquids, and processing without depositing coke on the reactor wall surfaces.

It is to be understood that this invention is not limited to the specific examples which have been offered merely as illustrations and that modifications may be made without departing from the spirit of the invention.

What is claimed is:

1. In a process of converting a high boiling normally viscous liquid hydrocarbon oil to low molecular weight normally gaseous unsaturated hydrocarbons and coke by contacting the high boiling viscous hydrocarbon oil with a gasiform dispersed suspension of hot inert particulate solids passing upwardly through a transfer line reaction zone, the improvement which comprises effecting an abrupt change of about 45° to 90° in the direction in the flow of the hot particulate solids gasiform suspension passing upwardly through said transfer line reaction zone to produce at the 45° to 90° bend a region of localized high particulate solids concentration, injecting the high boiling liquid hydrocarbon oil feed as an axial stream into the upper portion of said transfer line reaction zone at the 45° to 90° bend and in a downward direction countercurrent to the direction of flow at the axis of said hot upflowing particulate solids suspension in said transfer line reaction zone and axially opposed to the direction of flow of said upflowing hot particulate solids, the injection of said liquid oil feed at the region of the 45° to 90° change in direction in the flow of the hot particulate solids suspension through said transfer line reaction zone resulting in introducing the liquid oil feed into said region of localized high particulate solids concentration so that droplets of the high boiling liquid hydrocarbon feed are produced and improved contacting is obtained between the hot particulate solids and the liquid hydrocarbon oil feed and so that the liquid hydrocarbon oil droplets contact the hot particulate solids prior to contacting the inside surface of said transfer line reaction zone.

2. A process according to claim 1 wherein the change in direction of flow is about 90°.

3. A process according to claim 1 wherein said transfer line reaction zone is provided at said bend and change in direction of flow of the upflowing solids suspension and at its top portion with a recessed pocket extending above said bend for creating a localized region of high solids concentration and the liquid oil feed is injected into said recessed pocket and into said region of high concentration of solids.

4. A process according to claim 1 wherein said transfer line reaction zone is provided with a recessed pocket at the bend into which the liquid oil feed is injected.

5. A process according to claim 2 wherein said transfer line reaction zone is provided with a recessed pocket at the bend forming the change in direction of flow of the upflowing solids suspension.

6. A process according to claim 1 wherein said transfer line reaction zone is maintained at a temperature between about 1100° F. and 1800° F. and the contacting time in said reaction zone is not over about 2 seconds.

References Cited in the file of this patent

UNITED STATES PATENTS

| | | |
|---|---|---|
| 1,429,992 | Woegerer | Sept. 26, 1922 |
| 2,268,094 | Russell | Dec. 30, 1941 |
| 2,396,109 | Martin | Mar. 5, 1946 |
| 2,422,501 | Roetheli | June 17, 1947 |
| 2,731,508 | Jahnig et al. | Jan. 17, 1956 |
| 2,735,804 | Boston et al. | Feb. 21, 1956 |
| 2,736,687 | Burnside et al. | Feb. 28, 1956 |
| 2,767,233 | Mullen et al. | Oct. 16, 1956 |
| 2,813,916 | Boston | Nov. 19, 1957 |